United States Patent [19]

Steely, Jr. et al.

[11] Patent Number: 5,283,873
[45] Date of Patent: Feb. 1, 1994

[54] NEXT LINE PREDICTION APPARATUS FOR A PIPELINED COMPUTED SYSTEM

[75] Inventors: Simon C. Steely, Jr., Hudson, N.H.; David J. Sager, Acton, Mass.

[73] Assignee: Digital Equipment Corporation, Maynard, Mass.

[21] Appl. No.: 546,364

[22] Filed: Jun. 29, 1990

[51] Int. Cl.$^5$ .................. G06F 9/34; G06F 9/38; G06F 9/40

[52] U.S. Cl. .................. 395/375; 395/375; 395/200; 395/250; 395/800; 364/280.2; 364/280.3; 364/243.4; 364/243.41; 364/244.3; 364/247.2; 364/247.5; 364/258.1; 364/261.3; 364/262.4; 364/262.8; 364/262.9; 364/263.1; 364/275.8; 364/DIG. 1; 364/DIG. 2

[58] Field of Search ............ 395/375, 200, 250, 800, 395/275; 364/280.2, 280.3, 243.4, 243.41, 244.3, 247.2, 247.5, 258.1, 261.3, 262.4, 262.8, 262.9, 263.1, 275.8, DIG. 1, DIG. 2

[56] References Cited

U.S. PATENT DOCUMENTS

| | | | |
|---|---|---|---|
| 4,370,711 | 1/1983 | Smith | 395/375 |
| 4,430,706 | 2/1984 | Sand | 395/375 |
| 4,435,756 | 3/1984 | Potash | 395/375 |
| 4,722,046 | 1/1988 | Kasrazadeh et al. | 395/425 |
| 4,755,966 | 7/1988 | Lee et al. | 395/375 |
| 4,763,245 | 8/1988 | Emma et al. | 395/375 |
| 4,764,861 | 8/1988 | Shibuya | 395/375 |
| 4,777,594 | 10/1988 | Jones et al. | 395/375 |
| 4,811,215 | 3/1989 | Smith | 395/375 |
| 4,853,840 | 8/1989 | Shibuya | 395/375 |
| 4,860,197 | 8/1989 | Langendorf et al. | 395/375 |
| 4,894,772 | 1/1990 | Langendorf | 395/375 |
| 4,942,520 | 7/1990 | Langendorf | 395/375 |
| 5,093,778 | 3/1992 | Favor et al. | 395/375 |
| 5,136,696 | 8/1992 | Beckwith et al. | 395/375 |
| 5,142,634 | 8/1992 | Fite et al. | 395/375 |

Primary Examiner—Robert B. Harrell
Assistant Examiner—Dzung C. Nguyen
Attorney, Agent, or Firm—Kenyon & Kenyon

[57] ABSTRACT

A next line prediction mechanism for predicting a next instruction index to an instruction cache of a computer pipeline, has a latency equal to the cycle time of the instruction cache to maximize the instruction bandwidth out of the instruction cache. The instruction cache outputs a block of instructions with each fetch initiated by a next instruction index provided by the line prediction mechanism. The instructions of the block are processed in parallel for instruction decode and branch prediction to maintain a high rate of instruction flow through the pipeline.

7 Claims, 6 Drawing Sheets

NEXT LINE PREDICTION APPARATUS FOR A PIPELINED COMPUTED SYSTEM

FIELD OF THE INVENTION

The present invention is directed to a pipelined computer system, and more particularly, to a method and apparatus for predicting a next instruction to be fetched from an instruction cache of the computer pipeline.

BACKGROUND OF THE INVENTION

The processing of a single instruction by a computer system is performed in a number of different stages, such as instruction cache fetch, instruction decode and instruction execution. Many modern computer systems utilize an instruction pipeline to increase the speed of processing of an instruction. In a pipelined computer design, the various stages of instruction processing are arranged in series so that each one of the stages can process an instruction independently of the other stages during each cycle of pipeline operation and transmit its processing results to a next succeeding stage in the series for processing in a subsequent cycle. Of course, each stage receives as an input the output of a preceding stage of the series.

In this manner, a computer system does not have to wait for an instruction to be completely processed before fetching and processing a next instruction. For example, if the instruction pipeline comprises three stages, a first instruction that has been processed in previous cycles by each of the first and second stages will be processed in a current cycle by the third stage. During the same cycle, the second stage can process a second instruction that has already been processed by the first stage, and the first stage can process a third instruction, and so on. Pipelining of instructions is a much more efficient method of processing instructions in comparison with waiting for a single instruction to be completely processed before beginning the processing of a second instruction.

In a normal flow of a computer program, it is easy to know which instruction is to enter the pipeline next. In most instances, it is the next sequentially numbered instruction in the program that is to be processed so that, for example, instruction 101 will enter the pipeline in the cycle after instruction 100. An exception to this normal flow of control within a computer program is a branch instruction that instructs the computer system to fetch a next instruction that is out of the normal sequence of the numbered instructions.

For example, instruction 101 may be a conditional branch instruction that instructs the computer system to process instruction 200 if a certain condition is satisfied and to process instruction 102 if the condition is not satisfied. Accordingly, the next instruction to enter the pipeline will not be known until instruction 101 is processed by the execution stage of the pipeline to determine the status of the condition for selection of the next instruction. This results in a "bubble" in the pipeline behind the branch instruction since additional instructions cannot be entered into the pipeline during subsequent cycles until the branch instruction has flowed to the execution stage, which is typically at the end of the pipeline, and the next instruction, 200 or 102, that is to enter the pipeline becomes known.

To minimize bubbles, the prior art has provided branch prediction mechanisms to predict, early in the pipeline, as, for example, at the instruction decode stage, whether a branch will be taken and to fetch the predicted instruction from the instruction cache. Typically, the execution stage includes a device, such as a comparator, to compare each instruction input to the execution stage to the instruction that should be executed. Thus, if the branch prediction mechanism mispredicts the branch, the execution stage comparison will detect the wrong instruction at its input and issue a signal to the branch prediction mechanism to fetch the proper instruction. The pipeline is then backed up to the branch instruction, for processing with the proper branched to instruction following the branch instruction into the pipeline.

As should be understood, the speed up in the operation of the pipeline accomplished by the use of the branch prediction mechanism will be a function of the accuracy of the branch predictions made by the mechanism. However, despite the elimination of the relatively large bubbles for all correct conditional branch predictions, there is a certain amount of latency introduced into the pipeline by the branch prediction mechanism. More specifically, an index to the instruction cache for a next cycle of operation of the computer system pipeline is not available for input to the address input of the instruction cache until the branch prediction mechanism processes a current instruction to determine whether the current instruction is a branch instruction and thereafter to predict whether the branch is to be taken. This can take several cycles of pipeline operation for instruction cache fetch, instruction decode, and branch prediction, before an index for the next instruction is available for input to the address input of the instruction cache to continue pipeline operation.

The reduction in instruction cache bandwidth caused by the latency of the branch prediction mechanism can slow down the speed of operation of the execution stage. In other words, the pipeline might still not be able to deliver instructions to the execution stage as fast as the execution stage is able to process instructions since a small bubble will be introduced into the pipeline after each instruction fetch due to the latency of the branch prediction mechanism. The instruction cache itself can also introduce a latency into the pipeline since an advantageous size for the instruction cache may result in the need for several cycles of pipeline operation just to fetch an instruction.

Ideally, the pipeline should operate to deliver instructions to the execution stage at a rate that enables the execution stage to operate at its maximum speed. The total latency introduced into the pipeline by the instruction cache fetch and branch prediction has become a serious problem as the speed of instruction execution that can be achieved in an execution stage has increased. The execution stage will sit idle during each cycle that an instruction is not available for execution, resulting in a waste of computer resources. For example, if the total latency of instruction cache fetch and branch prediction is six nsec. and the execution stage can execute an instruction in two nsec., the execution stage will sit idle for four nsec. between the delivery of successive instructions.

In an attempt to minimize the branch prediction latency, a next instruction prediction approach has been suggested by the prior art as a partial solution. This is to simply assume a flow through to the next in number instruction for each fetch and to fetch that instruction prior to completion of processing by the branch prediction mechanism so that a next instruction is available for input to the pipeline as soon as possible. In some prior art devices, this is implemented by fetching two instructions at a time.

In other words, the prior art approach always assumes that no branch is taken. The branch prediction mechanism would then do a comparison similar to the comparison done by the execution stage, to determine whether the instruction fetched from the instruction cache in each cycle is the instruction that was predicted by the branch prediction mechanism. Again, the pipeline would be backed up to the branch instruction if the next instruction prediction was incorrect. With this approach, the effect of the latency introduced by the branch prediction mechanism can be overcome, at least for each flow through after a branch instruction. While this scheme keeps the pipeline full for all sequential instructions, no advantage is derived at the instruction fetch stage due to the operation of the branch prediction mechanism further downstream at the instruction decode stage.

Accordingly, the prior art has also suggested building a look-up table, typically an extension to each instruction cache entry indicating whether that instruction is a branch instruction and, if so, what the branch prediction mechanism predicted the last time the instruction was processed through the pipeline. The look-up information can, for example, comprise a pointer to the next instruction.

For each branch instruction, the pointer points either to a flow through instruction, when the branch prediction mechanism last predicted that the branch was not taken or to the branched to instruction, when the branch prediction mechanism last predicted that the branch was taken. For non-branch instructions, the pointer simply points to the next in number instruction (flow through). The look up table is filled by using the branch prediction mechanism output as write data to the look up table.

In this approach, however, the look-up table comprises an extension of the instruction cache. Thus, there is no speed advantage in the look up operation and this scheme does not entirely eliminate the latency introduced into the pipeline by the instruction cache fetch and the branch prediction mechanism. In addition, classical branch prediction in the computer art is typically limited to branch taken and flow through predictions for a conditional branch. Thus, the look up table would not contain information for other types of branches such as a subroutine return instruction. Moreover, the necessity of having an entry in the look-up table corresponding to each instruction in the instruction cache uses an inordinate amount of real estate on the chip or chips used to implement the pipeline.

Accordingly, there is a need for improvement in a scheme for predicting a next instruction index for the instruction cache, prior to completion of branch prediction processing of a previous instruction, so as to obtain an increase in instruction bandwidth sufficient to accommodate the speed of execution of the execution stage.

SUMMARY OF THE INVENTION

The present invention provides a new and improved method and apparatus for a next instruction prediction for an instruction cache. Generally, the invention comprises a line prediction mechanism provided with a memory having a latency that is less than the latency of the instruction cache. For example, the memory can be implemented with a number of entries that is less than the number of instructions stored in the instruction cache. The line prediction mechanism therefore stores branch information on some, but not all, i.e., a subset of the instructions stored in the instruction cache. Each line entry in the memory of the line prediction mechanism contains branch prediction information for an instruction including a predicted next instruction index to the instruction cache. The smaller size of the memory of the line prediction mechanism, relative to the size of the instruction cache, provides a relatively fast access to the line prediction mechanism so that a next instruction fetch from the instruction cache can be initiated as fast as the instruction cache can cycle through a fetch operation. Moreover, the line prediction mechanism accesses its own memory for a next instruction prediction and, accordingly, does not require the prediction of the branch prediction mechanism to operate. This will eliminate the latency introduced into the pipeline by the branch prediction stage.

The present invention recognizes that the principle of locality can be relied upon to provide accurate next instruction prediction information by maintaining prediction information relevant to a subset of the instructions stored in the instruction cache. The principle of locality indicates that references to data in a memory space is not random. Rather, when a computer is referring to data and instructions from a particular space within a physical memory, it will most probably continue to refer to the data and instructions from that particular space and also refer to data and instructions from a contiguous space, for a certain period of time. Accordingly, by storing prediction information for a subset of instructions greatly decreases the access time to that information while providing a high degree of accuracy in the predictions of next instruction fetch.

In accordance with a feature of the present invention, the branch prediction information stored in the memory of the line prediction mechanism can include an indication of the type of branch instruction and whether the branch prediction mechanism predicted branch taken or flow through to the next numbered instruction in the sequence of instructions. The type of branch information permits the line prediction mechanism to invoke one of several next instruction prediction schemes, as a function of the type of branch. Each branch type may require a different scheme to accurately predict a next instruction cache index, as will be described in more detail below.

Pursuant to another feature of the invention, several different components, each related to a next instruction prediction suitable for one or more selected ones of the different types of branch instructions, have outputs coupled to respective inputs of a multiplexer. An output of the multiplexer is coupled to the address input of the instruction cache. The components can include a line prediction RAM having an entry containing information on the branched to instruction for each type of branch wherein the instruction decode can provide the address of the branched to instruction, such as conditional branch, unconditional branch and subroutine call instructions; a next instruction adder to provide a flow through instruction index for any branch instruction for which the branch prediction mechanism predicted no branch taken; a sub stack or ring buffer to provide subroutine return instruction information and a computed go to instruction prediction register to store a predicted next instruction for a computed go to instruction.

A select line control device is coupled to a select line of the multiplexer. The select line control device takes as an input the branch type information associated with a current instruction as output by the line prediction mechanism. The select line control device selects the appropriate component for output by the multiplexer, depending on the type of branch indicated in the memory of the line prediction mechanism and thus provides an address input to the instruction cache comprising the most accurate next instruction prediction, consistent with the type of branch. Since the latency of the memory of the line prediction mechanism is less than the latency of the instruction cache, the total latency through the line prediction mechanism, including the latency of the multiplexer, can be designed to equal the latency of the instruction cache. Thus, the use of the multiplexer embodiment of the present invention can be implemented to improve prediction accuracy, while providing each next index to the instruction cache as fast as the instruction cache can cycle through an instruction fetch.

Pursuant to another feature of the present invention, the line prediction mechanism also contains branch position information, e.g., the instruction number of the branch instruction. In this manner, the stack or ring buffer used to predict a next instruction cache index after a subroutine return instruction can be updated by input of the number of a subroutine call instruction plus one. Thus, whenever the line prediction mechanism according to the present invention sees subroutine call instruction information, it will use the branch position information to update the stack or ring buffer.

In order to further increase the instruction bandwidth out of the instruction cache, the present invention provides for a multiple instruction fetch. For example, each index used to access the instruction cache will define a block of instructions, such as eight instructions, for output by the instruction cache. The multiple instruction fetch can be used to overcome the latency introduced into the pipeline by the instruction cache. The line prediction mechanism will contain branch prediction information for a branch instruction within each block. In this manner, an index for a next block of multiple instructions including a branched to instruction indicated in a previous block of multiple instructions can be input to the instruction cache as soon as the instruction cache has completed the fetch of the previous block. The index for the next block of multiple instructions is available for input to the instruction cache prior to the completion of processing of the instructions of the previous block by the branch prediction mechanism. The branch position information can be utilized to identify a branch instruction within each block of instructions.

DETAILED DESCRIPTION

Figure 1:
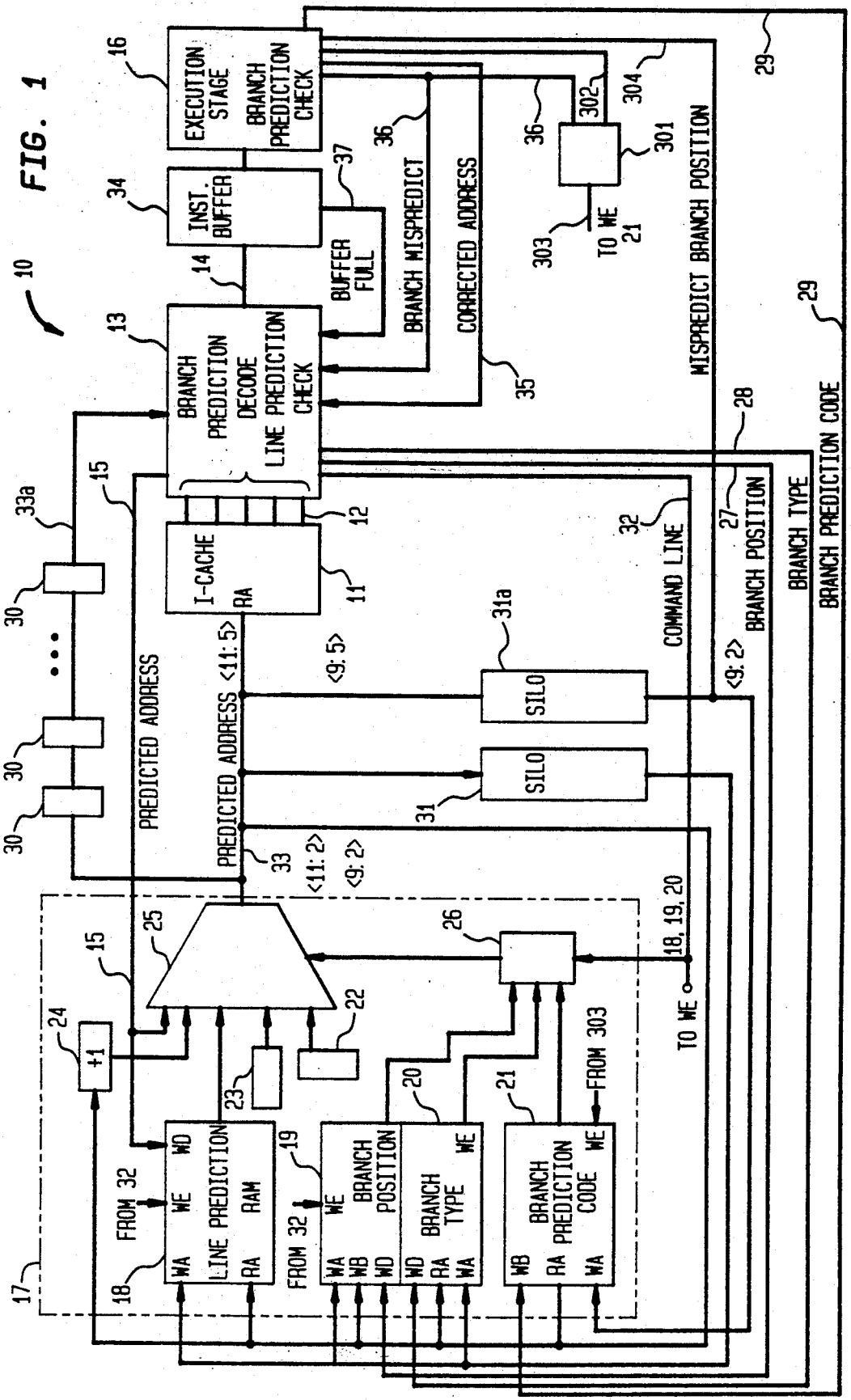
FIG. 1 is a block diagram of a computer pipeline including a next line prediction mechanism according to the present invention.

Referring now to the drawings, and initially to FIG. 1, there is illustrated a computer pipeline designated by the reference numeral 10. An instruction cache 11 contains a plurality of instructions for execution by the pipeline 10 pursuant to a computer program. The instruction cache 11 can comprise a 4K RAM storing all or a portion of the instructions of a computer program to be executed by the pipeline 10. As is well known in the art, the instructions stored in the instruction cache 11 are fetched from a main memory (not illustrated) and stored in the instruction cache for fast access. A main memory address for each instruction may comprise 32 bits and preselected ones of the main memory address bits of each instruction are used as an index to the instruction cache location of that instruction.

Pursuant to a feature of the present invention, a next line prediction mechanism 17 outputs an index 33 as a predicted read address (RA) to the instruction cache 11. In the illustrated embodiment of the present invention, eight instructions 12 are output simultaneously by the instruction cache 11 as a block of instructions. In order to fetch eight instructions at a time from the instruction cache 11, the index used for each fetch drops a certain number of low order bits of the instruction cache index. For example, in a 4K RAM instruction cache 11, a twelve bit index (typically twelve low order bits of the main memory address) is required to address each instruction cache location, which may comprise an eight bit byte. If each instruction is 32 bits or four bytes in length and eight instructions are fetched at once, the five low order bits are dropped from the instruction cache index. The instruction cache index would therefore comprise bits <11:5> of the main memory address and defines a space within the instruction cache 11 containing eight instructions. The block of instructions 12 is input to an instruction decode, branch prediction and line prediction check stage 13 of the pipeline 10.

The stage 13 examines each of the instructions 12 to decode each instruction, determine whether the instruction is a branch instruction and, if it is a branch instruction, predict whether the branch is taken. A line of instructions comprises a consecutive sequence of instructions within the block of eight instructions, from, e.g., a first instruction of the block to a branch instruction of the block that branches to an instruction in another block of eight instructions. The first instruction of the line can be any one of the eight instructions branched to from a previous block and the last instruction of the line can be the eighth instruction of the block if there are either no branch instructions in the block or a conditional branch instruction has a no branch taken prediction. Each decoded instruction 14 of the line is output by the stage 13 to a next stage of the pipeline 10.

In the illustrated embodiment of the invention, the next stage comprises an instruction buffer 34 that is, in turn coupled to an execution stage 16 for execution of decoded instructions. However, it should be understood that any number of stages can be arranged between the instruction buffer 34 and the execution stage 16. The execution stage 16 includes a corrected address output 35 and a mispredict command line 36, each coupled to the stage 13 for correction of a branch mispredict by the stage 13, as will be described below.

The next line prediction mechanism 17 and multiple instruction fetch operation of the instruction cache 11, according to the present invention, can, at peak performance, output instructions 14 faster than the execution stage 16 can execute the instructions 14. The instruction buffer 34 is utilized to buffer decoded instructions for input to the execution stage 16 when there is a slow down in the operation of the pipeline 10, as for example, during a back up due to an incorrect next line prediction or in the event of an instruction cache miss.

As described above, the instruction cache stores instructions fetched from main memory. If the pipeline 10 requires an instruction that has not been stored in the instruction cache 11 this is termed an instruction cache miss. The instruction must be fetched from main memory and stored into the instruction cache 11. During the latency introduced into the pipeline 10 by either a back up due to a misprediction or for a main memory fetch, the instructions buffered in the instruction buffer 34 can be output to the execution stage 16 for execution. Known trap logic can be used to interpret pipeline operation and backup to an instruction that resulted from a misprediction or sought data that is not in the instruction cache 11.

A buffer full command line 37 is output by the instruction buffer 34 and is coupled to the stage 13 to control the stage 13 when the instruction buffer 34 is full, as will be explained below.

The stage 13 outputs an address 15 indicating the next block of eight instructions to be fetched from the instruction cache 11. The address 15 reflects the branch prediction of the stage 13. More specifically, the address 15 will be to the follow through block if either no branch instruction is found in the current block of instructions 12 or a branch instruction was found, but the branch prediction processing of the stage 13 predicted no branch taken. In the event that a branch instruction is found in the current block of instructions 12 and the stage 13 predicts that the branch will be taken, the address 15 output by the st age 13 will be to the block of instructions containing the branched to instruction.

As described above, there are several types of branch instructions typically used in computer programs. Each type of branch instruction has differing branching characteristics. For example, a conditional branch instruction requires a branch to a specified out of sequence instruction when a specific condition is satisfied. Otherwise, the follow through instruction is to follow the branch instruction. The address of the branched to instruction is known upon instruction decode in stage 13. However, whether the branch is taken is not known until the execution stage 16 executes the instruction to determine the status of the condition. A conditional branch instruction provides a primary example of a branch instruction for which a branch prediction is advantageous for improved speed of operation of the pipeline since the execution stage is ordinarily arranged at the end of the pipeline 10.

On the other hand, a subroutine call instruction will always branch to the first instruction of the subroutine called by the subroutine call instruction. The address of the first instruction of the called subroutine is contained in the subroutine call instruction and can be determined at the decode and branch prediction stage 13. Thus, the address 15 output by the stage 13 for a subroutine call instruction will be the exact next instruction address.

An unconditional branch will also always branch to an instruction whose address is specified in the decoded unconditional branch instruction. Thus, the address output 15 output by the stage 13 comprises an exact next instruction address.

A computed go to instruction branches to an instruction whose address is computed in the execution stage 16. This type of branch instruction, while rare, does not lend itself to conventional branch prediction.

A subroutine return instruction is the last instruction of the subroutine called by a previous subroutine call instruction. The subroutine return instruction must flow to the execution stage 16 before the return address becomes known. Thus, a branch prediction is also necessary for a subroutine return instruction. However, the nature of the prediction differs from the manner of prediction performed by the branch prediction stage 13 for a conditional branch instruction, as will appear.

In any event, the stage 13 takes a certain number of cycles to process each instruction in the block of instructions for a branch prediction and does not provide the next block address until the branch prediction processing is completed. This introduces a latency into the pipeline. In many modern high speed computer pipelines, the execution stage 16 can execute each instruction at a speed that exceeds the latency of the branch prediction stage 13, even when multiple instructions are fetched from the instruction cache. Thus, the latency of the stage 13 precludes operation of the execution stage 16 at its maximum speed.

Pursuant to a feature of the present invention, the next line prediction mechanism, generally indicated by the reference numeral 17, is provided to predict the address 15 output by the stage 13 prior to the completion of branch prediction processing of a current block of instructions 12 so as to be able to initiate a fetch of the next block of instructions 12 as soon as the instruction cache has completed a previous fetch cycle.

As illustrated, the next line prediction mechanism 17 comprises a line prediction RAM 18, a branch position look up device 19, a branch type look up device 20, a branch prediction code look up device 21, a ring buffer 22, a computed go to instruction prediction register 23 and a next instruction adder 24. Each of the line prediction RAM 18, ring buffer 22, computed go to instruction prediction register 23 and next instruction adder 24 includes an output line coupled to a respective input of a multiplexer 25. Moreover, the address output 15 of the branch prediction stage 13 is also coupled to a respective input of the multiplexer 25 as a correction address for use in the event of a next instruction misprediction, as will be described below.

The line prediction RAM 18 is arranged to have a latency that is less than the latency of the instruction cache 11. For example, the line prediction RAM 18 can have an entry for each of a subset of the instructions stored in the instruction cache Each entry contains a predicated instruction address for a next line of instructions to follow the present line of instructions input into the pipeline 10. A read address (RA) input of the line prediction RAM 28 is coupled to a predicted address output 33 of the multiplexer 25. Thus, the line prediction RAM 18 is used to fetch a next line prediction based upon a current predicted address for subsequent output by the multiplexer 25, and so on.

In the illustrated embodiment of the present invention, the line prediction RAM 18 comprises a 256 entry RAM. A larger or smaller RAM can be utilized as a function of the prediction accuracy provided under the principle of locality discussed above, balanced against the desired increase in speed of access to the RAM entries. In any event, the line prediction RAM 18 is arranged so that the total latency of the line prediction mechanism 17 equals the cycle time of the instruction cache 11.

Each of the branch position look up device 19 and branch type look up device 20 has an entry corresponding to each branch prediction entry of the line prediction RAM 18.

Each entry in the branch position look up device 19 includes information on the position of the branch instruction within a block of instructions. This information can be used, for example, to provide a subroutine return prediction for input to the ring buffer 22, as will be described below.

Each entry in the branch type look up device 20 contains information on the type of branch instruction for control of the multiplexer output, i.e., control of the selection of one of the line prediction RAM 18, next instruction adder 24, ring buffer 22 or register 23 outputs for output by the multiplexer 25, as a function of the type of branch instruction.

Each entry in the branch prediction code look up device 21 includes information on the history of previous executions of a corresponding conditional branch instruction by the execution stage 16. There are a number of ways to encode the history of previous executions. For example, the history can be reflected by a one bit entry which indicates branch taken or not taken the last time the conditional branch instruction was executed. Multiple bit entries can provide information on branch taken or not for a number of previous executions of the conditional branch instruction. The information in the branch prediction code look up device 21 is derived from the execution stage 16, as will be described below. This information is used to select either the branched to instruction address output by the line prediction RAM 18 or the output of the next instruction adder 24. The address output 33 of the multiplexer 25 is coupled to an input of the next instruction adder 24. In the exemplary embodiment of the present invention, the next instruction adder 24 adds 1 to the least significant bit of the instruction cache index, i.e. bit 5 of the <11:5> index to calculate the index for a follow through block of eight instructions.

Each of the devices 19,20,21 includes a read address (RA) input, each read address input being coupled to the output 33 of the multiplexer 25 as is the read address (RA) input of the line prediction RAM 18. In this manner, the output 33 of the multiplexer 25, which comprises a next line address for an instruction cache fetch, is also wrapped around as a read address to each of the branch position look up device 19, branch type look up device 20 and branch prediction code look up device 21 and as an input to the next instruction adder 24. The output 33 of the multiplexer 25 is also coupled to a read address (RA) input of the instruction cache 11 to initiate an instruction fetch. As described above, the total latency of the line prediction mechanism 17 including the multiplexer 25 is equal to the cycle time of the instruction cache to maintain a maximum bandwidth for the output of instructions.

A select line controller such as a state machine 26 includes an output coupled to the select line of the multiplexer 25 and takes as inputs the outputs of the branch position look up device 19, the branch type look up device 20, and the branch prediction code look up device 21. A command line 32 couples the state machine 26 to the branch prediction stage 13 for control of the line prediction mechanism 17 during as e.g. a pipeline backup. The state machine 26 will output a select signal to control the multiplexer 25 as a function of the branch position, branch type and branch prediction code input to the state machine 26 and thereby select the output of one of the line prediction RAM 18, ring buffer 22, computed go to instruction register 23 or next instruction adder 24 to be the output 33 of the multiplexer 25 as a predicated index to the instruction cache 11.

The branch prediction stage 13 is arranged to output the address 15, as described above, the number of a branch instruction within the block (branch position code) 27, and the type of branch instruction (branch type) 28. The branch prediction stage 13 outputs 27,28 are input as write data (WD) to the devices 19,20, respectively, as illustrated. The address 15 is input as write (WD) to the line prediction RAM 18.

The line prediction mechanism 17 initially contains random, bogus prediction information. The write data (WD) provided by the branch prediction stage 13 is used to "train" the line prediction mechanism 17 by writing over the initial bogus prediction information as will be described in more detail below.

The stage 13 address output 15 comprises bits <11:2> for a next block of instructions, as predicted by the stage 13. Thus, the prediction RAM 18 stores bits <11:2> in each entry. As described above, only bits <11:5> of the instruction address are used as an index to the instruction cache 11. Accordingly, only bits <11:5> of the output 33 are input to the read address (RA) input of the instruction cache 11.

Since the line prediction RAM 18 and each of the look up devices 19-21 are of each of a smaller size than the instruction cache 11, only bits <9:2> of bits <11:2> of the output 33 are used to index the line prediction RAM 18 and the look up devices 19-21. Thus bits <9:2> of the output 33 are input to the read address (RA) input of each of the line prediction RAM 18 and the look up devices 19-21. It should be noted that the index for the line prediction RAM 18 uses bits <4:2> that are not used in the instruction cache index which, as indicated, are bits <11:5>. Bits <4:2> can be used to specify specific ones of the of the eight instructions within the same block so that several entries in the line prediction RAM 18 can correspond to different lines of instructions in the same block.

The branch prediction processing of each instruction address output by the multiplexer 25 can take several cycles to complete, namely one or more cycles for the instruction cache 11 to output the instruction block, one or more cycles for the decode stage to decode the instructions so as to determine whether one or more of the instructions of the block is a branch instruction, and one or more cycles for the branch prediction stage 13 to make predictions regarding branch instructions within each block. The branch prediction stage 13 will also perform a line prediction check by comparing the address of each instruction input to the stage 13 by the instruction cache 11, in response to the instruction index input by the multiplexer 25, with the address of the instruction it has predicted.

To that end, the output 33 of the multiplexer 25 is input to the stage 13, via a plurality of state devices 30, which can comprise latches, so that an output 33a from the state devices 30 is delayed a number of cycles equal to the latency of the stages 11, 13. Accordingly, the instruction address input to the stage 13 via the state devices 30 will correspond to the branch prediction output address 15 that required the above noted number of cycles to process. If the comparison indicates that the multiplexer output 33a does not match the predicted address 15, the pipeline will be backed up to the block of the branch instruction, as will be described below.

The output of the multiplexer 25 is also input to a silo 31. The silo 31 will have a length equal to the latency of the branch prediction processing. An output of the silo 31 is coupled to a write address (WA) input to each of the line prediction RAM 18, branch position look up device 19, branch type look up device 20, and branch prediction code look up device 21 to update these components upon a line misprediction with the write data (WD) provided by the stage 13 as will be described below. The plurality of state devices 30 and the silo 31 can be implemented as a single silo having different taps.

The output of the multiplexer 25 is further input to a second silo 31a. The bits <9:5> of the output address 33 are siloed by the silo 31a. The silo 31a will have a length equal to the latency of the pipeline 10 from the output 33 of the multiplexer 25 to the output of the execution stage 16. The execution stage 16 also outputs a three bit mispredict position code 304 to indicate the number of, e.g., a conditional branch within the block defined by the correction address 35, in the event of a branch misprediction by the stage 13. The three bits of the mispredict branch position code 304 are concantonated as bits <4:2> to the bits <9:5> output by the silo 31a to provide a write address (WA) to the branch prediction code look up device 21. The delay of the silo 31a synchronizes its output to the address of the block being executed by the execution stage 16.

A write enable control device 301 takes as inputs, the branch mispredict signal 36 from the execution stage 16 and a branch type signal 302, also provided by the execution stage 16. The branch type signal 302 indicates the type of branch for which the following instruction into the execution stage 16 is incorrect causing the branch mispredict signal to be asserted by the execution stage 16. When the branch type indicates a conditional branch and the branch mispredict signal is asserted, the write enable control device 301 outputs a write enable signal on a line 303. The line 303 is coupled to a write enable (WE) input of the branch prediction code look up device 21. A combination of a branch mispredict signal and a conditional branch for the branch type indicates that the stage 13 mispredicted the outcome of a conditional branch instruction and that the branch prediction code look up device 21 must be updated or trained.

To that end, the execution stage 16 also outputs a branch prediction code on signal line 29, indicating the corrected prediction history for the conditional branch that resulted in the assertion of the branch mispredict signal. The signal line 29 is coupled to a write data (WD) input of the branch prediction code look up device 21. The output of the silo 31a together with the concantonated bits of the mispredict branch position code 304 are input to the write address (WA) input of the branch prediction code look up device 21. When the write enable signal is asserted on line 303, the branch prediction output of the execution stage 16 is written into the branch prediction code look up device 21 at the location identified by the output of the silo 31a and the concantonated bits of the mispredict branch position code 304.

Figure 2:
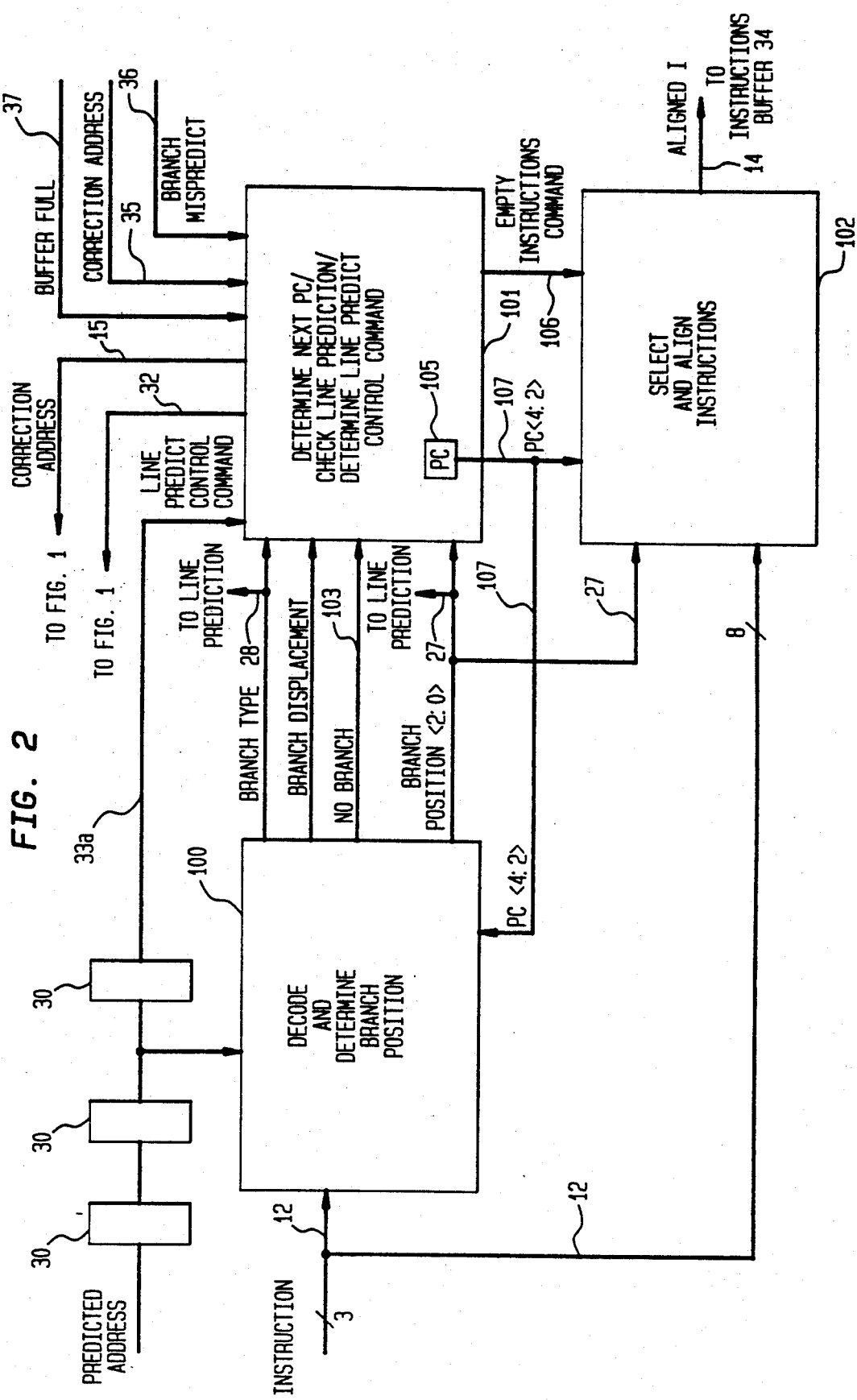
FIG. 2 is a block diagram of a branch prediction stage of the computer pipeline of FIG. 1.

Referring now to FIG. 2, there is illustrated the instruction decode, branch prediction and line prediction check stage 13 according to the present invention. Generally, the stage 13 comprises a decode and determine branch position stage 100, a determine next PC, check line prediction and determine line prediction control command stage 101 and a select and align instructions stage 102. The stage 100 receives the eight instructions 12 fetched from the instruction cache using the predicted address 33 output of the multiplexer 25 (a current block). Also input to the stage 100 are the delayed predicted address 33a from the line prediction mechanism 17, and bits <4:2> 107 of the instruction address of an expected current block of instructions from a program counter 105 (PC) arranged in the stage 101. Bits <4:2> of a 32 bit instruction address will identify the first instruction of a line within the expected current block. The stage 100 examines each instruction of the input block of eight instructions 12 to determine a line of instructions within the block, i.e., a consecutive sequence of instructions from a first instruction of the block to be transmitted to the instruction buffer 34, as identified by bits <4:2>, through a last instruction or end of the line, at either an instruction with a predicted branch taken to a next instruction of another block or the eighth instruction, when there are no instructions subsequent to the first instruction of the line that requires a branch taken.

The stage 100 generates and outputs the branch position 27 (bits <2:0> of the instruction address of the end of the line, which indicates the number of that instruction within the block of eight instructions, $2^3=8$), determines and outputs the branch type 28, generates and outputs a no-branch command 103 (when there are no branches taken in the block of instructions 12) and determines and outputs a branch displacement number 104. The branch displacement number 104 is contained in a branch instruction and indicates how far it is to the branched to instruction, to permit a calculation of the address of the branched to instruction as will appear. Each of the branch type 28, branch displacement 104, no-branch command 103 and branch position 27 are input to the stage 101. The branch position 27 and branch type 28 are also input to the line prediction mechanism 17, as illustrated in FIG. 1.

The stage 101, in addition to the inputs received from the stage 100, receives as inputs the buffer full command 37 from the instructions buffer 34, the correction address 35 and branch mispredict command 36 from the execution stage 16 and the delayed predicted address 33a from the line prediction mechanism 17. The function of the stage 101 is to check if the address for a next line 33 predicted by the prediction mechanism 17 is correct. The stage 101 includes the program counter (PC) 105 that contains the address for the instruction that should be fetched from the instruction cache 11. The PC 105 is used to identify an address for a next line of instructions, as will appear. The stage 101 outputs bits <4:2> of an address for an expected current line of instructions to each of the stage 100 and 102, an empty instruction command 106 to the stage 102 to control the output of instructions to the instruction buffer 34, as will be explained below, a line mispredict command on the command line 32 when the index 33a does not match the output of the PC 105 and the correction address 15 to the line prediction mechanism 17, as illustrated in FIG. 1.

Finally, the stage 102 takes the eight instructions 12 fetched from the instruction cache 11 and outputs only the instructions of the line of instructions within the block of eight instructions, as identified by the stage 100. The bits <4:2> 107 input to the stage 102 from the PC 105 indicate the first instruction of the block that is to be executed and the branch position bits <2:0> 27 provided by the stage 100 indicate the number of the instruction within the current block, after the first instruction of the line, where a branch is taken or when the no branch command 103 is asserted and the branch position indicates the last instruction of the block. The output instructions 14, comprising the line of instructions within a current block 12, are input to the instruction buffer 34.

Figure 3:
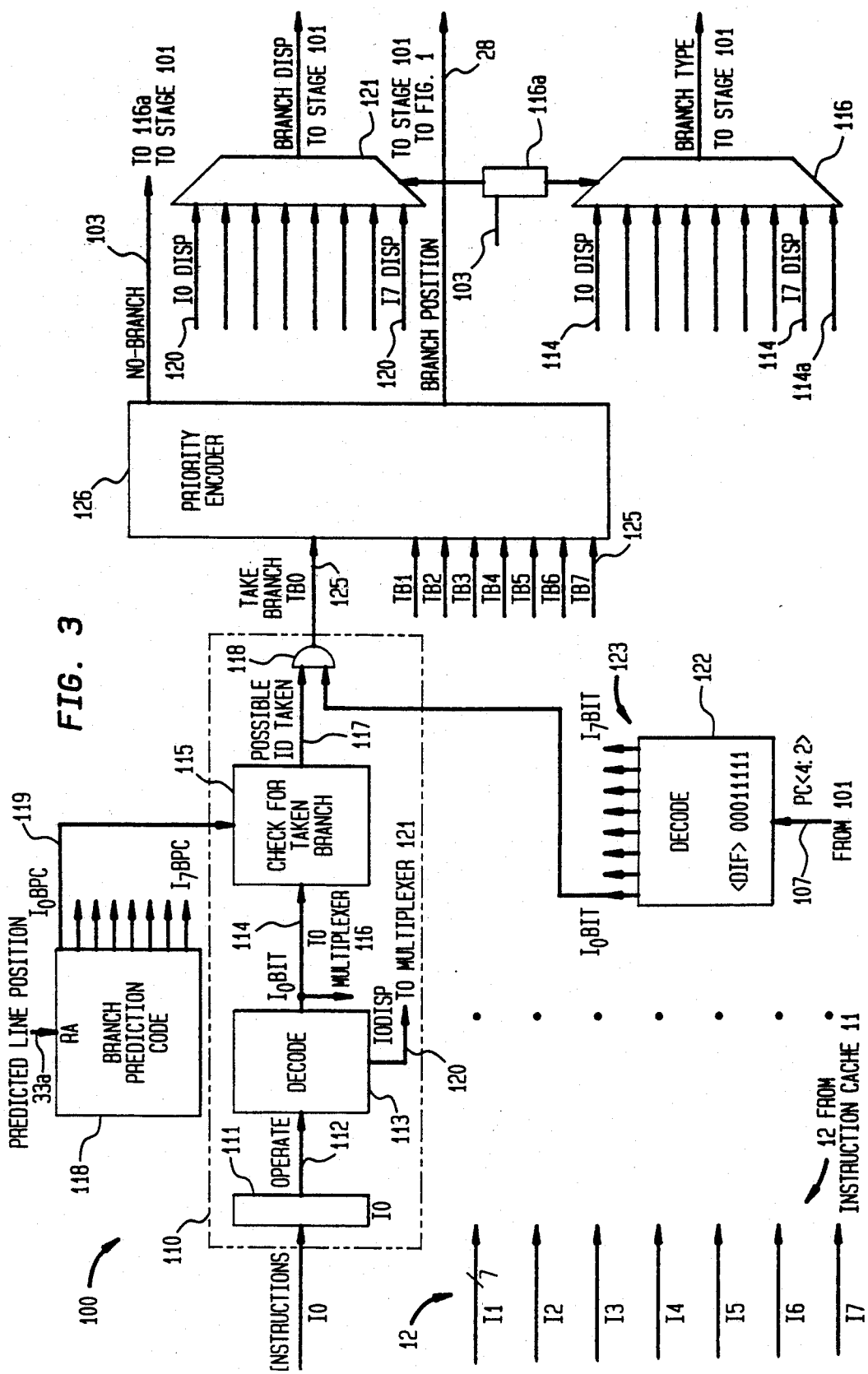
FIG. 3 is a detailed block diagram of a decode and determine branch position stage of the branch prediction stage of FIG. 2.
Figure 4:
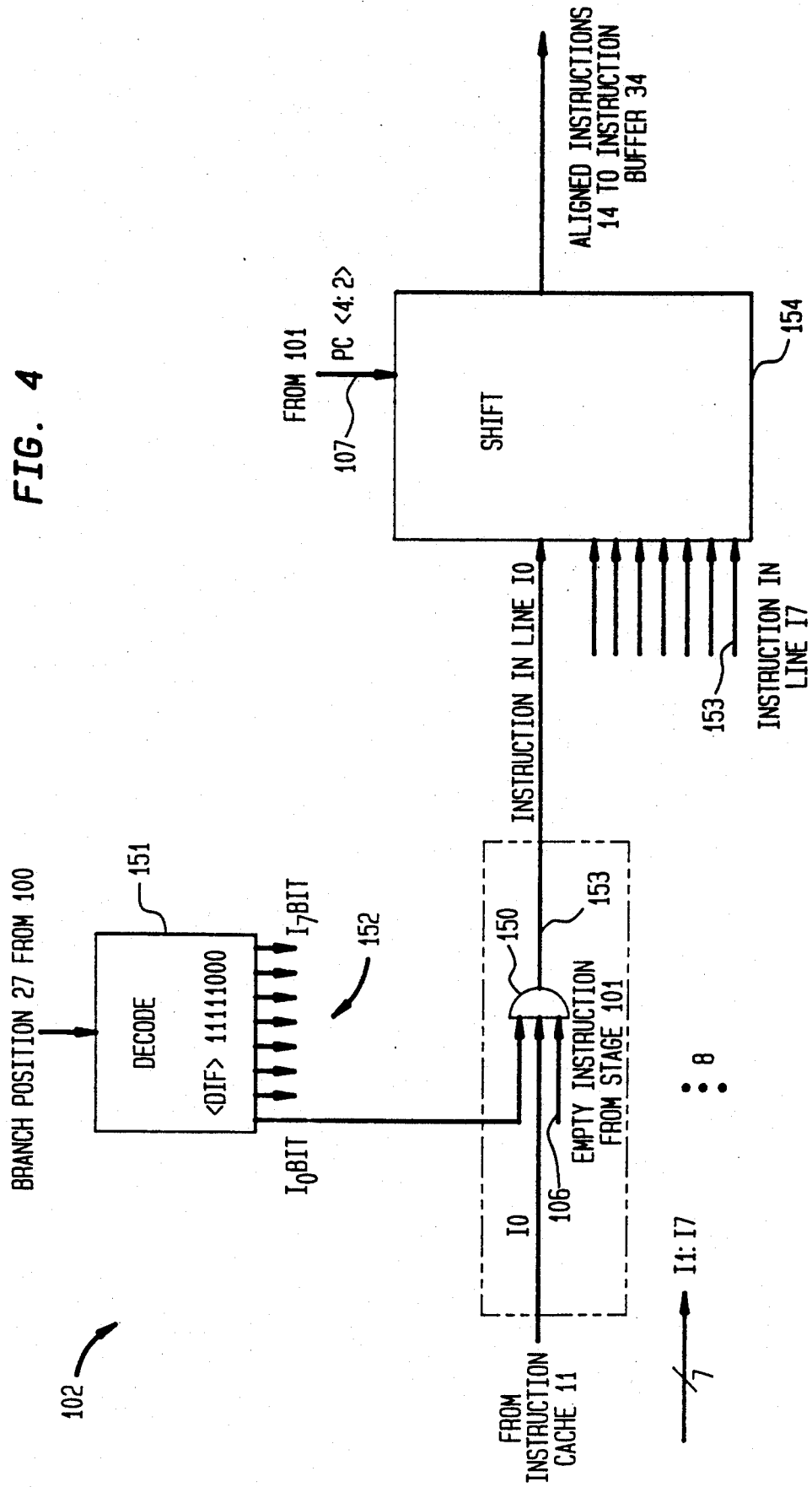
FIG. 4 is a detailed block diagram of a check line prediction stage of the branch prediction stage of FIG. 2.
Figure 5:
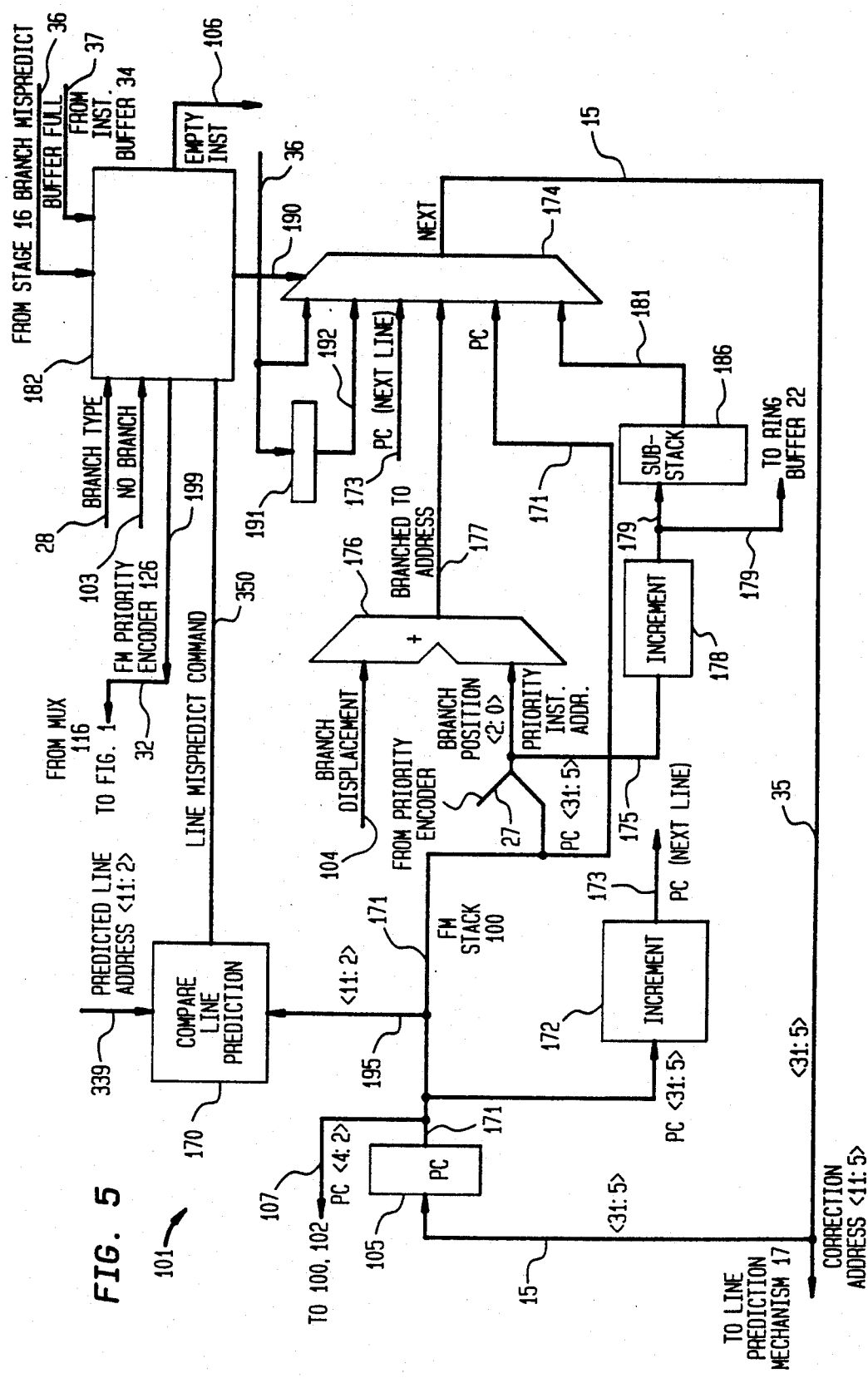
FIG. 5 is a detailed block diagram of a select and align instruction stage of the branch prediction stage of FIG. 2.

Referring now to FIGS. 3-5, there is a detailed illustration of each of the stages 100, 101 and 102, respectively. As shown in FIG. 3, the stage 100 comprises eight decode and branch prediction stages 110, one for each of the eight instructions of the block 12, designated as instruction $I_0$-$I_7$. The instructions $I_0$-$I_7$ are processed in parallel to maximize the rate of output of decoded instructions 14 to the instruction buffer 34.

Each decode and branch prediction stage 110 includes a register 111 to temporarily store the respective instruction $I_0$-$I_7$ and to transmit the opcode portion 112 of the instruction $I_0$-$I_7$ to a decode device 113. The decode device 113 examines the opcode to determine if the instruction is a branch instruction and outputs a branch type signal 114, designated as $I_0$ BT-$I_7$ BT depending on the opcode of the respective instruction $I_0$-$I_7$ input to the decode device 113. The signal 114 comprises a three bit code to indicate the type of instruction. The three bit code is defined as follows:

000 conditional branch
001 unconditional branch
010 subroutine call instruction
011 subroutine return instruction
100 computed go to instruction
101 fall through (i.e. the instruction is not a branch instruction)

The signal $I_0$ BT-$I_7$ BT 114 of each stage 110 is input to a respective check for branch taken device 115. The signals $I_0$ BT-$I_7$ BT from the eight stages 110 are also each input to a respective input of a multiplexer 116. A ninth input 114a to the multiplexer 116 always inputs a branch type 101- no branch code to the ninth input of the multiplexer 116.

The device 113 can also determine the displacement number for a branch instruction and outputs a signal 120 to indicate the displacement number (designated $I_0$ disp-$I_7$ disp). The signals 120 from the stages 110 are each input to a respective input of a multiplexer 121.

Each check for branch taken device 115 examines the branch type code of the input signal 114 ($I_0$ BT-$I_7$ BT). For the branch types that are always taken, i.e. 001-unconditional branch, 010-subroutine call instruction, 011-subroutine return instruction and 100-computed go to instruction, the device 115 outputs a possible branch taken signal 117 as a logical 1. The signal 117 is applied to an input of an AND gate 118.

As illustrated in FIG. 3, the delayed predicted line address 33a is input as a read address (RA) to a branch prediction code look up table 118 maintained in the stage 100. The look up table 118 outputs a prediction code 119 for each of the eight instructions of the current block of instructions 12. The prediction codes 119 are designated $I_0$ BPC-$I_7$ BPC for the instructions $I_0$-$I_7$, respectively. The stage 110 examining instruction $I_0$ receives $I_0$ BPC, the stage 110 examining instruction $I_1$ receives $I_1$ BPC and so on. The code $I_0$ BPC reflects the history of whether a branch was taken in the event that the respective instruction $I_0$-$I_7$ is a conditional branch instruction. The check for branch taken device 115 examines the prediction code $I_0$ BPC to determine whether the branch is taken when the branch type signal $I_0$ BT indicates 000-conditional branch. When the prediction code $I_0$ BPC indicates a branch taken prediction, the check for branch taken device 115 will output the possible branch taken signal 117 as a logical 1 to the AND gate 118. Otherwise, the device 115 will not assert the signal (logical zero). When the branch type code is 101 fall through (not a branch instruction) the device 115 will not assert the possible branch taken signal 117 (logical zero).

The stage 100 is provided with a decoder 122 that receives bits <4:2> 107 of the instruction address indicated by the PC 105 as the next instruction to enter the instruction buffer 34. The decoder 122 utilizes bits <4:2> 107 to generate a mask signal 123 eight bits wide, one bit corresponding to each instruction $I_0$-$I_7$, to control the selection of the first instruction of a line of instructions within the current block 12.

As described above, bits <11:5> of a main memory address for an instruction are used to index the instruction cache 11 to fetch a block of eight instructions 12. Bits <4:2> of the main memory address of the instruction indicated by the PC 105 as a next instruction, will select one of the eight instructions from the block 12. The instruction identified by bits <4:2> will be the first instruction within the block 12 that should be input to the instruction buffer 34. The subsequent consecutive instructions of the block 12 should follow the instruction identified by bits <4:2> until a branch taken instruction requires a branch to another block of instructions.

Thus, the mask 123 generated by the decode 122 from bits <4:2> 107 comprises a mask of 1's with a 1 on for each instruction from the number indicated by bits <4:2> onward. For example, referring to FIG. 6, if a first block of instructions includes instructions 200-207 and the PC indicates that instruction 200 is the next to enter the instruction buffer 34, bits <4:2> will be 0,0,0. Accordingly, the mask generated by the decoder 122 will be 1 1 1 1 1 1 1 1. If bits <4:2> equal, e.g., 1,0,1 (instruction $I_5$ of the block $I_0$-$I_7$) then the mask will be 0 0 0 0 0 1 1 1, meaning that the PC 105 expects instruction 205 next and instructions 200-204 are to be ignored. Such a situation indicates that instruction 205 is a branched to instruction from a previous block 12. Each bit of the mask signal 123 is input to a respective input of the AND gate 118 of the stage 110 corresponding to the instruction $I_0$-$I_7$ represented by the bit. The output 125 of each AND gate 118, designated as $TB_0$-$TB_7$, will be a logical 1 if the possible branch taken signal 117 of the respective stage 110 is a logical 1 and the corresponding bit of the mask signal 123 is also a logical 1. Otherwise, the signal $TB_0$-$TB_7$ will be a logical zero. All of the signals $TB_0$-$TB_7$ are input to a priority encoder 126.

The priority encoder 126 determines the first one of the signals $TB_0$-$TB_7$ that is a logical one i.e. the first AND gate output 125 that indicates possible branch taken 117 as a logical one with the corresponding bit of the mask signal 123 also a logical one. That instruction $I_0$-$I_7$ represents the end of a line of instructions within the current block 12 since the signal 117 set as a logical 1 indicates that the respective instruction is a branch instruction with the branch taken and the logical one on the corresponding bit of the mask signal 123 indicates that it is an instruction equal to higher than the first instruction of the block 12 expected by the PC 105, as reflected on bits <4:2> 107.

For example, referring once again to FIG. 6, the mask signal for instructions 200-207 is 1 1 1 1 1 1 1 1 when bits <4:2> are 0, 0, 0. If instructions 200 and 201 ($I_0$, $I_1$) are not branch instructions (signal 117 set at logical zero) and instruction 202 (the third instruction $I_2$) is a branch instruction with the branch taken (signal 117 set at logical one), the AND gate 118 for the stage 110 processing introduction $I_2$ will be the first AND gate 118 of the eight to have a logical 1 output.

The priority encoder 126 outputs the branch position 27 that comprises a three bit code (bits <2:0> of the address of the last instruction of the line) identifying the last instruction of the line within a current block of instructions 12, as identified from $TB_0$-$TB_7$. The priority encoder 126 is also arranged to output the no branch signal 103, as a one bit signal set as a logical one, to the stage 101 when all of the $TB_0$-$TB_7$ signals are a logical zero, i.e. no branch taken after the first instruction of the line. The no branch signal 103 is also input to a select line control 116a for the multiplexer 116. The output of the select line control 116a is coupled to the select line of the multiplexer 116.

The branch position 27 is used as a select line control for each of the multiplexers 116 and 121. The branch position 27 directly controls the select line of the multiplexer 121 and is also input to the select line control 116a. The select line control 116a concantonates the three bits of the branch position 27 with the one bit of the no branch taken signal 103. The no branch taken bit is placed as the high order bit of the concantonated bits and selects the ninth input to the multiplexer 116 when it is set at logical one. In this manner, the branch position determined by the priority encoder 126 selects each of the $I_0$ BT-$I_7$ BT or no branch 114a signal and the $I_0$ disp - $I_7$ disp signal corresponding to the last instruction of the line within the current block 12 for output by the multiplexers 116 and 121 respectively as the branch type 28 and branch displacement 104, respectively. The branch type 28 and branch position 28 are input as write data (WD) to the line prediction mechanism 17 (see FIG. 1) to "train" the line prediction mechanism 17, as will be explained below. The branch position 27 is also input to the stage 101 to align the instructions of the line for output to the instruction buffer 34 and the branch displacement 104 is input to the stage 101 for use in computing a next instruction for the PC 105, as will appear.

Referring now to FIG. 4, there is illustrated the select and align instruction stage 102. The stage 102 comprises a set of eight AND gates 150, each receiving as an input one of the instructions $I_0$-$I_7$. A decoder 151 receives the branch position 27 from the stage 100 as an input and utilizes the branch position 27 to generate a mask signal 152. The mask 152 signal comprises eight bits, one corresponding to each of the eight instructions in the current block 12. The mask is set to have a logical 1 at each bit from the first instruction of the block to the instruction identified by the branch position 27 followed by a zero for each subsequent bit. For example, a branch position value of 111 produces a mask signal 152 of all 1's. A branch position value of 011 produces a mask of 11110000 and so on. The bit of the mask signal 152 corresponding to a particular instruction $I_0$-$I_7$ is input to the AND gate 150 for that particular instruction $I_0$-$I_7$.

Each AND gate 150 will pass the respective instruction $I_0$-$I_7$ through to it output 153 when the corresponding bit of the mask signal is set at a logical Accordingly, all instructions $I_0$-$I_7$ having an address equal to or less than the last instruction of the line will be output by its respective AND gate 150. The outputs 153 of the AND gates 150 are each input to a shift and align device 154.

As illustrated in FIG. 4, an empty instruction command 106 from the stage 101 is also input to each AND gate 150. The empty instruction command 106 will input a zero to each AND gate 150 to prevent any of the instructions from being passed through its respective AND gate 150. The assertion of the empty instruction command 106 will be discussed below.

The shift and align device 154 is arranged to output only those instructions of the block 12 that have been identified to be within the line defined by the bits <4:2> provided by the PC 105 and the branch position 27 determined by the stage 100. For example, assume that the instructions $I_0$-$I_7$ of a current block fetched from the instruction cache 11 using the output 33 of the line prediction mechanism 17 comprises instructions A, B, C, D, E, F, G, H, respectively. Also assume that the bits <4:2> 107 of the next instruction address expected by the PC 105 indicates 010 (instruction $I_2$=C) and the branch position 27 determined by the stage 100 through the generation of the $TB_1$-$TB_7$ signals and operation of the priority encoder 126 is 110 ($I_6$=G). That means that the line of instructions within the current block to be passed to the instruction buffer 34 comprises instructions C, D, E, F and G ($I_2$-$I_4$). Instruction C is the instruction listed in the PC 105 as the next instruction it expects and instruction G was determined by the stage 100 to be the first branch instruction after instruction C with a possible branch taken signal 117 asserted.

The outputs 153 of the AND gates 150 will be A, B, C, D, E, F, G, O since the mask signal 152 for a branch position of 110 is 11111110. The shift and align device 154 receives bits <4:2> 107 from the stage 101, in our example 010. Thus, the shift and align device 154 can determine that the instructions to be passed to the instruction buffer 34 from the current block are C-G. The shift and align device uses the bits <4:2> to shift to the left and align all of the instructions by the value of bits <4:2>, thus the instructions are output as instruction 14 comprising, in series, instructions C, D, E, F, G, H, O, O, O.

Figure 6:
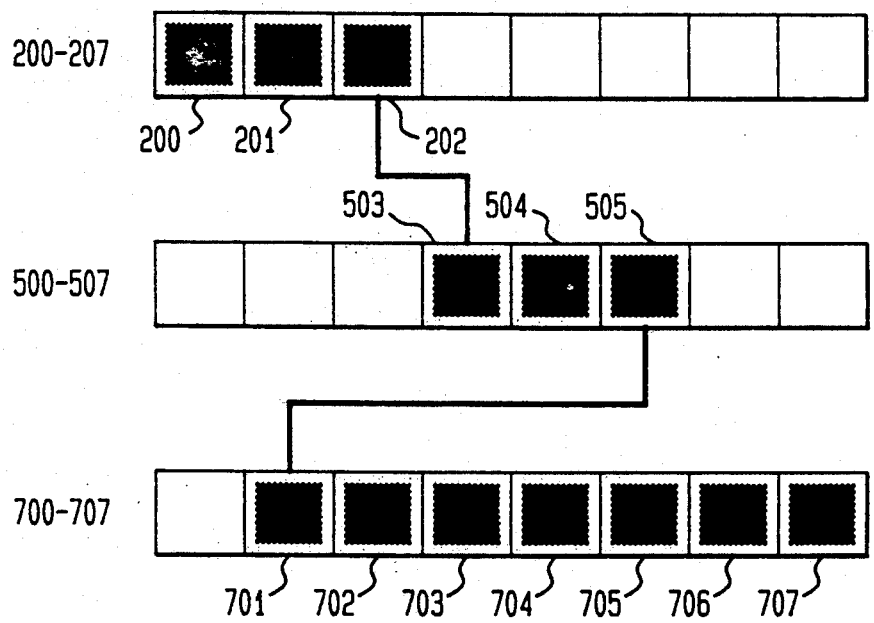
FIG. 6 is an illustration of a set of instructions as executed by the compute pipeline of FIG. 1.

Referring now to FIG. 5, the stage 101 is used to check if the address 33 used to fetch the block of instructions 12 is correct. As discussed above, the address 33 is output by the multiplexer 25 of the next line prediction mechanism 17 as a prediction of the next block of instructions predicted by the stage 13 and reflected in the PC 105. As illustrated in FIG. 6, assume that instructions 200-206 fetched from the instruction cache 11 are correct. Now assume that the index 33 for block 200-206, When wrapped around as a read address input to the line prediction RAM 18 and other devices 19, 20, 21 outputs a predicted next address 33 from the multiplexer 25 that fetches instruction 500-507 from the instruction cache 11, i.e. the prediction is that the branch indicated in instruction 202 is predicted taken to an instruction, e.g. instruction 503 in the block of instruction 500-507. It must be determined whether the next block output by the instruction cache 11, i.e. 500-507, is correct.

To that end, the stage 101 comprises a comparator 170 that receives as inputs the delayed address 33a used to fetch the block 500-507 and bits <11:5> 195 of the output of the PC 105. As described above, the PC 105 contains the address of the next block of instructions expected for input to the execution stage 16. During the processing of each block 12, the PC 105 outputs bits <31:5> 171 of the instruction address stored therein to identify a correct current block as predicted by the stage 13. The bits <11:5> 195 of bits <31:5> are compared to the bits <11:5> of the delayed address 33a to verify that the correct block expected by stage 13 was predicted by the line prediction mechanism 17. If they match, the block instructions 500-507 is assumed to be correct and nothing further happens at this time vis-a-vis the processing of the now current block of instructions 500-507. A line mispredict command 32 is generated by the comparater 170 and output on a line 350 when the comparison does not result in a match.

Referring to FIG. 1, the line mispredict command asserted by the comparator 170 is placed on the command line 32 as will be described, when there is not a match between PC bits <11:5> and bits <11:5> of the delayed address 33a and will act as a write enable signal (WE) to each of the line prediction RAM 18, branch position look up device 19 and the branch type look up device 20. As described above, the output of the silo 31 is input as a write address (WA) to each of the line prediction RAM 18 and the look up devices 19, 20. The output of the silo 31 is the predicted address output 33 of the multiplexer 25, delayed by the latency of the instruction cache 11 and the stage 13 so that the write address (WA) correctly corresponds to the outputs 15, 27, 28 relating to the current block of instructions e.g. a block other than the block 500-507, as indicated by the PC 105.

Thus, the correct prediction information from the stages 100, 101, 102, including the correct predicted next address 15, as will appear, and branch position and branch type 27,28 for the current block, are written into the line prediction RAM 18 and the look up devices 27,28, respectively, at the location in the line prediction RAM 18 and look up devices 27,28 indexed by the output of the silo 31 to "train" the line prediction mechanism 17. After the correct prediction information is stored in the line prediction mechanism 17, the next time the same index is used to fetch instructions from the instruction cache 11, the line prediction RAM 18 will output the address for a current next block to initiate the next instruction cache fetch as soon as the instruction cache 11 is ready, assuming that the PC 105 contains a correct next address.

The stage 101 also determines the next instruction address for loading into the PC 105 and for use to train the prediction mechanism 17 with the correction address 15 when the line mispredict command is applied on the command signal line 32, as described above, through the output 15 of a multiplexer 174. To that end, the bits <31:5> 171 from the PC 105 are also input to an incrementor 172 to add one to bit 5 and thereby provide an address 173 for a next in sequence block, e.g. 508-507, to be used as an input to the PC 105 when there are no branch instructions in the current block of instructions. The output 173 of the incrementor 172 is applied to a respective input of the multiplexer 174 and designated PC next line. The bits <31:5> 171 from the PC 105 are also input to a respective input to the multiplexer 174.

The bits <31:5> 171 are further concatenated with the branch position 27 input from the stage 100 and inserted into bit positions <4:2> to obtain an address 175 for the predicted branch taken instruction within the line of the current block of instructions. The address 175 is input to an adder 176. The branch displacement 104 received from the stage 100 is also input to the adder 176 to provide an output 177 that comprises the sum of the address 175 of the predicted branch taken and the branch displacement 104. The output 177 comprises the address of the branched to instruction 177 indicated in the branch instruction, as explained above. For example, the output address 177 can be to instruction 701 of the block of instruction 700-707 (see FIG. 6). The output address 177 from the adder 176 is input to a respective input of the multiplexer 174.

The address 175 of the predicted branch taken is also input to an incrementor 178 to provide an address equal to the branch instruction plus one. The output 179 is input to a stack 180 for use to predict a return address for a subroutine return instruction. An output 181 of the stack 180 is input to a respective input of the multiplexer 174.

The correction address 36 from the execution stage 16 represents the address of an instruction that is expected by the execution stage 16. When an address output by the PC 105 is incorrect due to a branch mispredict by the stage 13, the execution stage 16 asserts the branch mispredict signal 35 to control the stage 101, as will be explained, so that the correction address 36 is input to the PC 105 for subsequent retrieval of the correct instruction from the instruction cache 11. To that end, the correction address 36 is input to a respective input of the multiplexer 174. The correction address 36 is also input to a computed go to instruction prediction register 191 when the respective instruction is a computed go to instruction. The branch mispredict signal can indicate a computed go to instruction to control the loading of the register 191. An output 192 of the register 191 is coupled to an input of the multiplexer 174. As explained above, the branch mispredict signal is also used to train the branch prediction code look up device 21.

As indicated, the multiplexer 174 is used to select one of the inputs as the next address 15 for input to the PC 105 and to the line prediction mechanism 17 when the line mispredict signal is asserted on the command line 32. A decision table 182 is arranged to receive, as inputs, the no-branch signal 103 from the priority encoder 126, the line mispredict command signal on line 350 from the comparator 170, the branch mispredict signal 35 from the execution stage 16, the buffer full signal 37 from the instruction buffer 34 and the branch type signal 28 from the multiplexer 116. The decision table 182 has an output 190 coupled to the select control of the multiplexer 174.

The decision table 182 selects the output 192 of the computed go to instruction prediction register 191 for output as the next address 15 to the PC 105 when the branch type signal 28 indicates 100-computed go to instruction.

When the execution stage 16 receives an incorrect instruction, it will assert the branch mispredict signal 35 and transmit the address of the correct instruction 36 to the multiplexer 174. When the branch mispredict signal 35 is asserted, the decision table 182 selects the correction address 36 as the next address 15 for input to the PC 105.

When the no-branch signal 103 from the priority encoder 126 (see FIG. 3) is asserted, the decision table 176 selects the address 173 (PC next line) for input to the PC 105.

When the branch type 28 from the multiplexer 116 (see FIG. 3) is either conditional branch, unconditional branch or subroutine call instruction, the decision table selects the branched to address 177 for input to the PC 105.

When the line mispredict command is asserted by the comparator 170, the decision table 182 selects the PC input 171 to the multiplexer 174 for output to recycle the same PC instruction address. The decision table also asserts the line mispredict command on the line 32 for input to the state machine 26 (see FIG. 1) to control the line mispredict mechanism 17 for update, as will be explained below.

The decision table 182 asserts the empty instruction command 106 while a correction address 35 is being propagated to the line prediction mechanism 17 and through the instruction cache 11, as for example, after the execution stage 16 asserts the branch mispredict signal 36. As described above, the empty instruction command is sent to the stage 102 as an input to each AND gate 150 to prevent instructions of a current block from passing to the shift and align device 154 (see FIG. 4).

The decision table 182 also receives the buffer full command 37 from the instruction buffer 34 when the instruction buffer 34 is full and cannot accept any further instructions. When either the buffer full command 37 or the empty instruction command 106 are being asserted, the decision table selects the PC output 171 as the output 15 to wrap around the current PC value to the PC 105 so that the pipeline 10 can start from the same block of instructions after either the buffer full command 37 or the empty instruction command 106 is deasserted.

The decision table 182 selects the output 181 of the stack 180 when the branch type 28 indicates a subroutine return instruction.

The decision table 182 also asserts a correct address command 199 for output on the command line 32 to the line prediction mechanism 17 when an instruction cache miss occurs, to control the operation of the multiplexer 25, as will be explained.

As described above, the address output 33 of the multiplexer 25 is a prediction since the branch prediction by the stage 13 is not completed in time to output the predicted address 15 until several cycles after an index is input to the address input of the instruction cache 11. More specifically, the output 33 of the multiplexer 25 is wrapped around as a read address to each of the line prediction RAM 18, branch position look up device 19, branch type look up device 20 and branch prediction code look up device 21, as described above.

In the operation of the line prediction mechanism 17 after training, the input of bits <9:2> of the read address to the line prediction RAM 18 causes the line prediction RAM 18 to output the instruction address of the branched to instruction indicated by a branch instruction within the block of instructions defined by the read address. The information contained within the line prediction RAM 18 generally corresponds to conditional branch, unconditional branch and subroutine call instructions since each of these types of branch instructions defines a certain branched to instruction. More specifically, these types of branch instructions specify the address of the branched to instruction if a condition is satisfied, in the case of a conditional branch instruction, the address of the branched to instruction in the case of an unconditional branch or the address of the first instruction of a subroutine, in the case of a subroutine call instruction. The output of the line prediction RAM 18 is input to the multiplexer 25.

The input of the read address to the branch position code look up device 19 causes the device 19 to output the number of the branch instruction within the block of eight instructions. That number is input to the state device 26. Likewise, the input of the read address to each of the branch type look up device 20 and the branch prediction code look up device 21 causes these devices to output codes indicating the type of branch and the branch prediction, respectively, for input to the state machine 26.

The state machine 26 generates an output to control the select line of the multiplexer 25, depending on a state defined by the combination of the inputs applied by the branch position look up device 19, branch type look up device 20 and branch prediction code look up device 21. For example, the branch type output of the branch type look up device 20 can indicate one of the following branch types:
conditional branch
subroutine call instruction
subroutine return instruction
computed go to instruction
unconditional branch
no branch in block The presence of a branch type from the branch type look up device 20 output indicating either a subroutine call instruction or unconditional branch will cause the state machine 26 to assume a state having an output selecting the output of the line prediction RAM 18 for output by the multiplexer 25 as the predicted next instruction cache address. This is because, as explained above, in each of these types of branches, a branch is always taken and the branch instruction defines the address of the branched to instruction, which can be stored in the corresponding entry of the line prediction RAM 18.

When the code provided by the branch type look up device 20 indicates a conditional branch and the branch prediction code output indicates branch taken, the state machine 26 also assumes the state selecting the output of the line prediction RAM 18.

When the code provided by the branch type look up device 20 indicates a conditional branch and the branch prediction code output indicates flow through, the state machine 26 assumes a state selecting the output of the next address adder 24 for output by the multiplexer 25. The adder 24 receives as an input the output 33 of the multiplexer 25 and the output of the next instructions adder 24 will be the address of the next consecutive block.

During the processing of each subroutine call instruction, the address of the subroutine call instruction plus one is input to the ring buffer 22 for use as the predicted address for a subsequent subroutine return instruction. The branch position information provided by the branch position look up device 19 will indicate the number of the subroutine call instruction in the current block. The operation of the ring buffer 22 is fully described in U.S. application Ser. No. 451,943, filed Dec. 18, 1989, which is hereby expressly incorporated by reference.

When the code provided by the branch type look up device 20 indicates a subroutine return instruction, the state machine 26 assumes a state selecting the output of the ring buffer 22 as the output of the multiplexer 25.

As described above, the branched to instruction of a computed go to instruction is not known until the execution stage 16 processes the computed go to instruction. Pursuant to the present invention, the execution stage 16 stores the address of the branched to instruction in the computed go to instruction prediction register 23 when it processes a computed go to instruction. Computed go to instructions are typically used infrequently in computer programs so that the value of the branched to address of a previously processed computed go to instruction most likely will refer to the same instruction the next time a computed go to instruction is input to the pipeline 10. Accordingly, the address stored in the computed go to instruction prediction register 23 provides a prediction of the next address.

Finally, when the type of branch provided by the branch type look up device 20 indicates a computed go to instruction, the output of the computed go to instruction prediction register 23 is selected as the output of the multiplexer 25.

The state machine 26 also receive the command line 32 from the stage 13. As explained above, the command line can transmit either the line mispredict command asserted by the comparator 170 or the correct address command asserted by the decision table 182 (see FIG. 5). When the line mispredict command is asserted, the state machine 26 selects the corrected address 15 received from the stage 13 for input to the instruction cache 11. The line mispredict command also enables each of the devices 19,20 for update, as explained above. When the correct address command is asserted, as during the assertion of the branch mispredict by the execution stage 16, the state machine 26 re-initiates the line prediction mechanism 17.

What is claimed is:

1. A computer pipeline comprising:
   a) an instruction cache storing a plurality of instructions and having an address input and a data output;
   b) a next line prediction mechanism coupled to the address input of the instruction cache;
   c) a prediction check stage coupled to the data output of the instruction cache;
   d) an execution stage coupled to the prediction check stage;
   e) the instruction cache outputting at least one of the plurality of instructions in response to application of a preselected address at the address input;
   f) the next line prediction mechanism including
      1) a next instruction address prediction memory having a plurality of entries, latency of the next instruction address prediction memory being less than the latency of the instruction cache, each one of the plurality of entries storing branch information including a next instruction address, for one of the plurality of instructions;
      2) the next instruction address prediction memory including a read address input for input of an instruction address and an output for output of the branch information corresponding to the instruction address;
      3) the output being coupled to each of
         the address input of the instruction cache,
         the read address input of the next instruction address prediction memory for input of a next instruction address, and
         a predicted line address input of the prediction check stage;
   g) the prediction check stage having an instruction input for receiving at least one of the plurality of instructions from the instruction cache;
   h) the prediction check stage including a branch prediction device having an input coupled to the predicted line address input, the branch prediction device accepting the instruction addresses from the next line prediction mechanism, the branch prediction device containing branch taken history for the instruction addresses, the branch prediction device operating to predict the next instruction address for the input at least one of the plurality of instructions;
   i) the prediction check stage including a prediction checker to compare the next instruction address output of the branch prediction device to the output of the next instruction address prediction memory to determine one of a match or a mismatch,
      1) the prediction check stage accepting the instruction from the instruction cache only upon a match;
      2) the prediction check stage having an output coupled to the next line prediction mechanism for outputting corrected prediction information to the next line prediction mechanism upon a mismatch; and
   j) the prediction check stage outputting accepted instructions to the execution stage for execution.

2. The computer pipeline of claim 1, wherein
   a) the next instruction address prediction memory further includes
      1) a next instruction address prediction RAM storing next line prediction information and having an output, a subroutine return instruction prediction memory storing predicted subroutine return addresses and having an output, and a computed go to instruction prediction register storing computed go to branch instruction address predictions and having an output, each of the next instruction address prediction RAM, the subroutine return instruction prediction memory, and the computed go to instruction prediction register having an input coupled to the read address input of the next instruction address prediction memory;
   b) the next line prediction mechanism further including
      1) a multiplexer having a plurality of inputs, an output coupled to the read address input of the instruction cache and a select line;
      2) the next instruction address prediction RAM output, the subroutine return address prediction memory output and the computed go to instruction prediction register output each being coupled to a respective one of the plurality of multiplexer inputs;
3) a multiplexer select line controller having an output coupled to the select line and an input to receive a branch prediction code and branch type for an instruction address input to the next instruction address prediction memory;
4) the multiplexer select line controller for selecting one of the next instruction address prediction RAM output, the subroutine return instruction prediction memory output, and the computed go to instruction prediction memory output, for output by the multiplexer as a function of the branch prediction code and the branch type; and
5) the multiplexer output including a next portion of an address which corresponds to a next at least one of the plurality of instructions to be executed.

3. The computer pipeline of claim 1, wherein the prediction check stage further includes a decoding portion, a check line prediction portion, and a select and align portion,
   a) the decoding portion including the branch prediction device and having
      1) a first input for receiving the at least one of the plurality of instructions from the instruction cache, and
      2) a second input for receiving a predicted line address, which corresponds to at least one of a plurality of an instructions received at the first input, from the next line prediction mechanism for accessing, in the branch prediction device, the branch taken history of the corresponding at least one of the plurality of instructions from the instruction cache,
      3) the decoding portion utilizing the accessed branch history to predict a branch taken address of the at least one of the plurality of instructions;
   b) the check line prediction portion including the prediction checker and operating to compare the predicted branch address with the output of the next line prediction mechanism which corresponds to the predicted branch address, the check line prediction portion operating to output corrected prediction information to the next line prediction mechanism upon determination of a mismatch and operating to accept the instruction from the instruction cache which corresponds to the output of the next line prediction mechanism upon a match; and
   c) the select and align portion operating to output accepted instructions to the execution stage.

4. The computer pipeline of claim 3 wherein the at least one of the plurality of instructions is a block of instructions and the instruction cache outputs the block of instructions in response to input of a preselected portion of an address at the address input of the instruction cache.

5. The computer pipeline of claim 4 wherein the next instruction address prediction memory accepts at the read address input, the preselected portion of the address and outputs branch information corresponding to the block of instructions associated with the input preselected portion of the address, and the at least one of the plurality of instructions output from the instruction cache is the block of instructions.

6. The computer pipeline of claim 5, wherein
   a) the next instruction address prediction memory further includes
      1) a next instruction address prediction RAM storing next line prediction information and having an output, a subroutine return instruction prediction memory storing predicted subroutine return address an having an output, and a computed go to instruction prediction register storing computed go to branch instruction address predictions and having an output, each of the next instruction address prediction RAM, the subroutine return instruction prediction memory, and the computed go to instruction prediction register having an input coupled to the next address input of the next instruction address prediction memory;
   b) the next line prediction mechanism further including
      1) a multiplexer having a plurality of inputs, an output coupled to the read address input of the instruction cycle and a select line;
      2) the next instruction address prediction RAM output, the subroutine return address prediction memory output and the computed go to instruction prediction register output each being coupled to a respective one of the plurality of multiplexer inputs;
      3) a multiplexer select line controller having an output coupled to the select line and an input to receive a branch prediction code and branch type for an instruction address input to the next instruction address prediction memory;
      4) the multiplexer select line controller for selecting one of the next instruction address prediction RAM output, the subroutine return instruction prediction memory output, and the computed go to instruction prediction memory output, for output by the multiplexer as a function of the branch prediction code and the branch type; and
      5) the multiplexer output including a next portion of an address which corresponds to a next block of instructions to be executed.

7. The computer pipeline of claim 6 wherein
a) the branch prediction device further includes
1) a code prediction device, having an input coupled to the output of the multiplexer and a respective output for each instruction of the block of instructions, the code prediction device accepting the next portion of the address and outputting, for each instruction of the block of instructions, the branch taken history of the respective instruction;
2) a plurality of decoding parts, each of the plurality of decoding parts coupled to a respective one of the outputs of the code prediction device and a respective one of the block of instructions output from the instruction cache,
   i) each of the plurality of decoding parts operating to determine an instruction type, the instruction type including one of a subroutine call instruction, a subroutine return instruction, a computer go to instruction, a conditional branch instruction, or a no branch instruction, each of the plurality of decoding parts utilizing the instruction type and the branch taken history to output a branch taken signal;

3) each of the plurality of decoding parts utilizing the instruction from the instruction cache to determine a branch displacement;
4) an encoding device having a plurality of inputs, each coupled to a respective one of the plurality of decoding parts, and a branch displacement output, a branch type output, and a branch position output, the encoding device operating to output from the branch displacement output and the branch type output respectively, the branch displacement of a first of the plurality of decoding parts which indicates the branch taken signal and a branch type for the first of the plurality of decoding parts, the encoding device operating to output from the branch position output a position of the first of the plurality of decoding parts within the plurality of decoding parts;

b) the check line prediction portion accepting as input the branch position output, the branch displacement output, and the branch type output from the decoding portion, utilizing the input information to determine a branched to address;

c) the check line prediction portion comparing the branched to address with the output of the next instruction address prediction memory to determine one of a match or a mismatch;

d) the check line prediction portion operating to output corrected prediction information to the next line prediction mechanism upon determination of a mismatch and operating to output a validated portion of the branched to address to the select and align portion upon determination of a match; and e) the select and align portion receiving as inputs the validated branched to address from the check line prediction portion, the branch position output from the decoding portion, and the block of instructions from the instruction cache, the select and align portion operating to output only the instructions from the block of instructions preceding and including the one of the instructions of the block of instructions which corresponds to the branch position output.

* * * * *